US008035769B2

(12) United States Patent
Wang

(10) Patent No.: US 8,035,769 B2
(45) Date of Patent: Oct. 11, 2011

(54) LCD DISPLAY HOLDER WITH SLIDING COUPLING

(76) Inventor: Nai-Hsuan Wang, Taichung (TW)

( * ) Notice: Subject to any disclaimer, the term of this patent is extended or adjusted under 35 U.S.C. 154(b) by 742 days.

(21) Appl. No.: 12/129,699

(22) Filed: May 30, 2008

(65) Prior Publication Data
US 2009/0296015 A1 Dec. 3, 2009

(51) Int. Cl.
*G02F 1/1333* (2006.01)
(52) U.S. Cl. .......................................... 349/58; 361/600
(58) Field of Classification Search ........................ None
See application file for complete search history.

(56) References Cited

U.S. PATENT DOCUMENTS

| 6,651,943 B2 * | 11/2003 | Cho et al. ................... 248/122.1 |
| 7,656,469 B2 * | 2/2010 | An ................................. 349/58 |
| 2007/0064380 A1 * | 3/2007 | Shin ............................. 361/681 |

* cited by examiner

*Primary Examiner* — Thanh-Nhan Nguyen

(57) ABSTRACT

A device for holding an LCD display includes a substantially U-shaped support adapted to stably rest upon a flat surface, the support having two upright arms; a fastening plate threadedly secured to the LCD display; and a hollow coupling extending rearward of the fastening plate, the coupling comprising two vertically aligned first holes proximate one side, two vertically aligned second holes proximate the other side, a first threaded hole at one side, and a second threaded hole at the other side. The arms are adapted to pass through the first and second holes, a first fastener is adapted to drive through the first threaded hole to secure to one arm, and a second fastener is adapted to drive through the second threaded hole to secure to the other arm.

3 Claims, 5 Drawing Sheets

LCD DISPLAY HOLDER WITH SLIDING COUPLING

BACKGROUND OF THE INVENTION

1. Field of Invention

The invention relates to LCD (liquid crystal display) display holders and more particularly to such an LCD display holder having a sliding coupling with improved characteristics.

2. Description of Related Art

Conventionally, a holder is provided for supporting a computer monitor (e.g., LCD display) on the desk. However, most conventional LCD display holders are not structural strong. Thus, the conventional LCD display holders are subject to damage after a short time of use. Thus, a need for improvement exists.

SUMMARY OF THE INVENTION

It is therefore one object of the invention to provide a device for holding an LCD display comprises a substantially U-shaped support adapted to stably rest upon a flat surface, the support having two upright arms; a fastening plate threadedly secured to the LCD display; and a hollow coupling extending rearward of the fastening plate, the coupling comprising two vertically aligned first holes proximate one side, two vertically aligned second holes proximate the other side, a first threaded hole at one side, and a second threaded hole at the other side. The arms are adapted to pass through the first and second holes, a first fastener is adapted to drive through the first threaded hole to secure to one arm, and a second fastener is adapted to drive through the second threaded hole to secure to the other arm.

The above and other objects, features and advantages of the invention will become apparent from the following detailed description taken with the accompanying drawings.

DETAILED DESCRIPTION OF THE INVENTION

Figure 1:
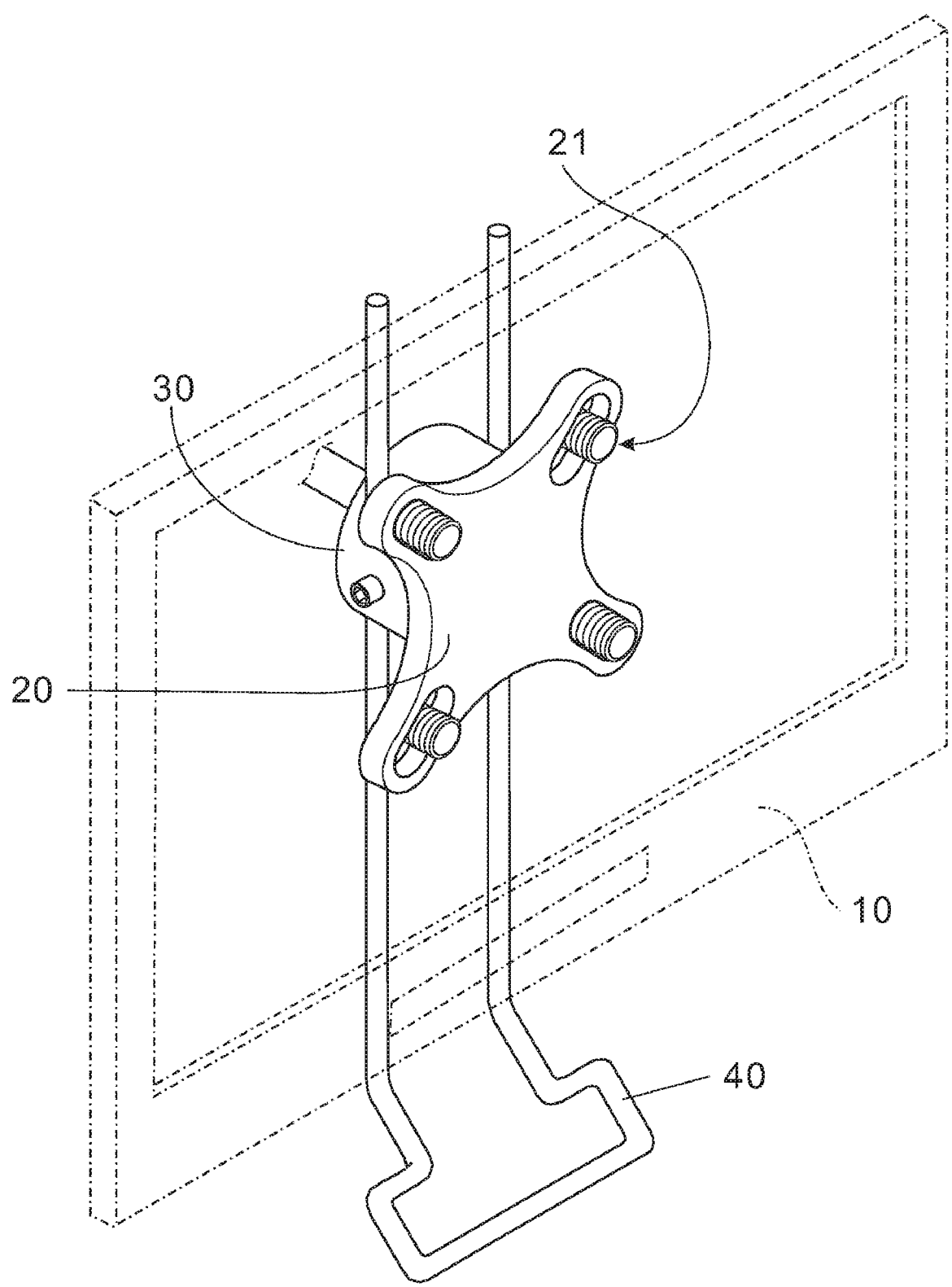
FIG. 1 is a perspective view of a first preferred embodiment of LCD display holder according to the invention with a mounted LCD display being shown in dotted lines.
Figure 2:
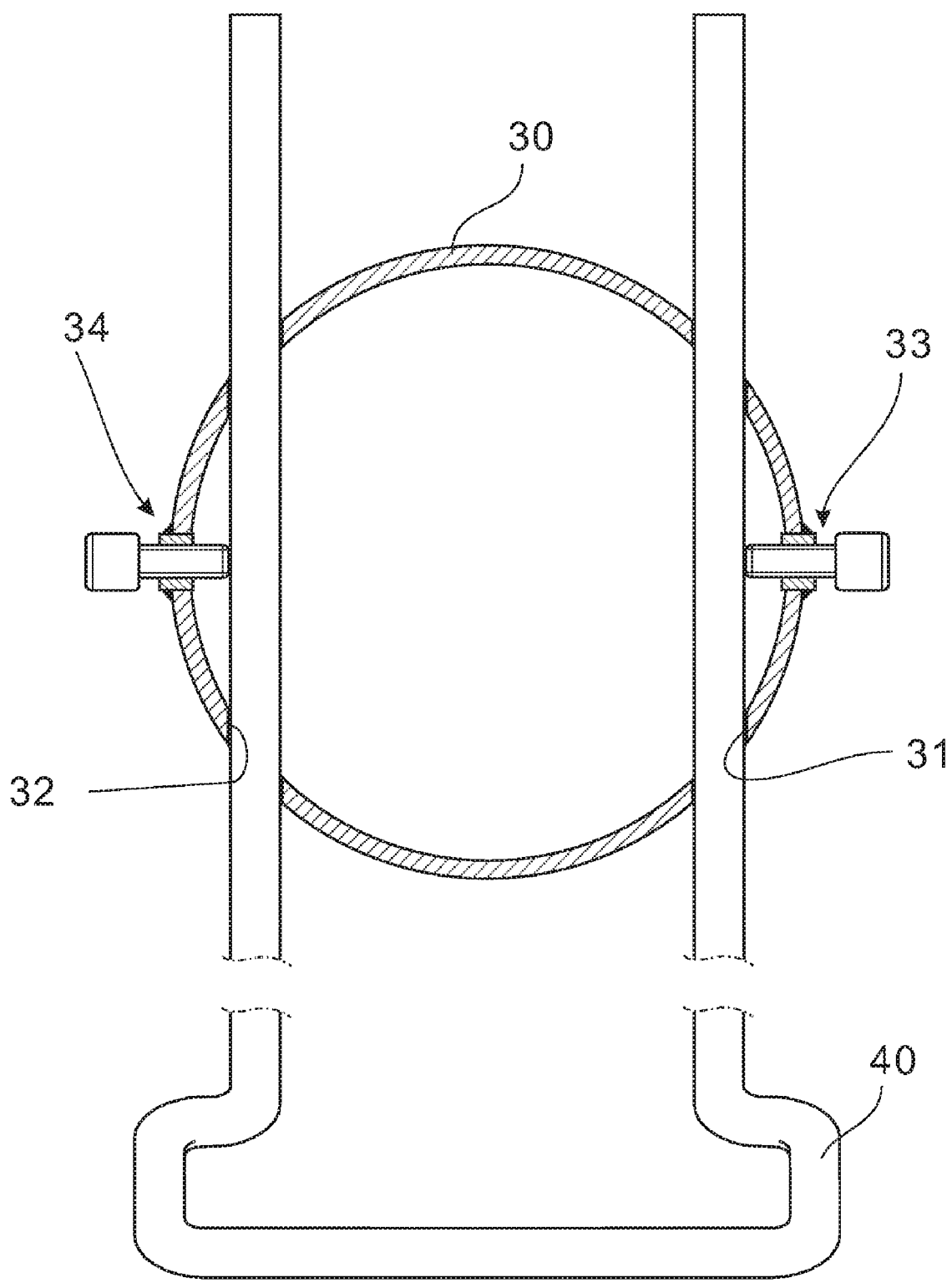
FIG. 2 is a longitudinal sectional view of the coupling of the holder of FIG. 1.
Figure 3:
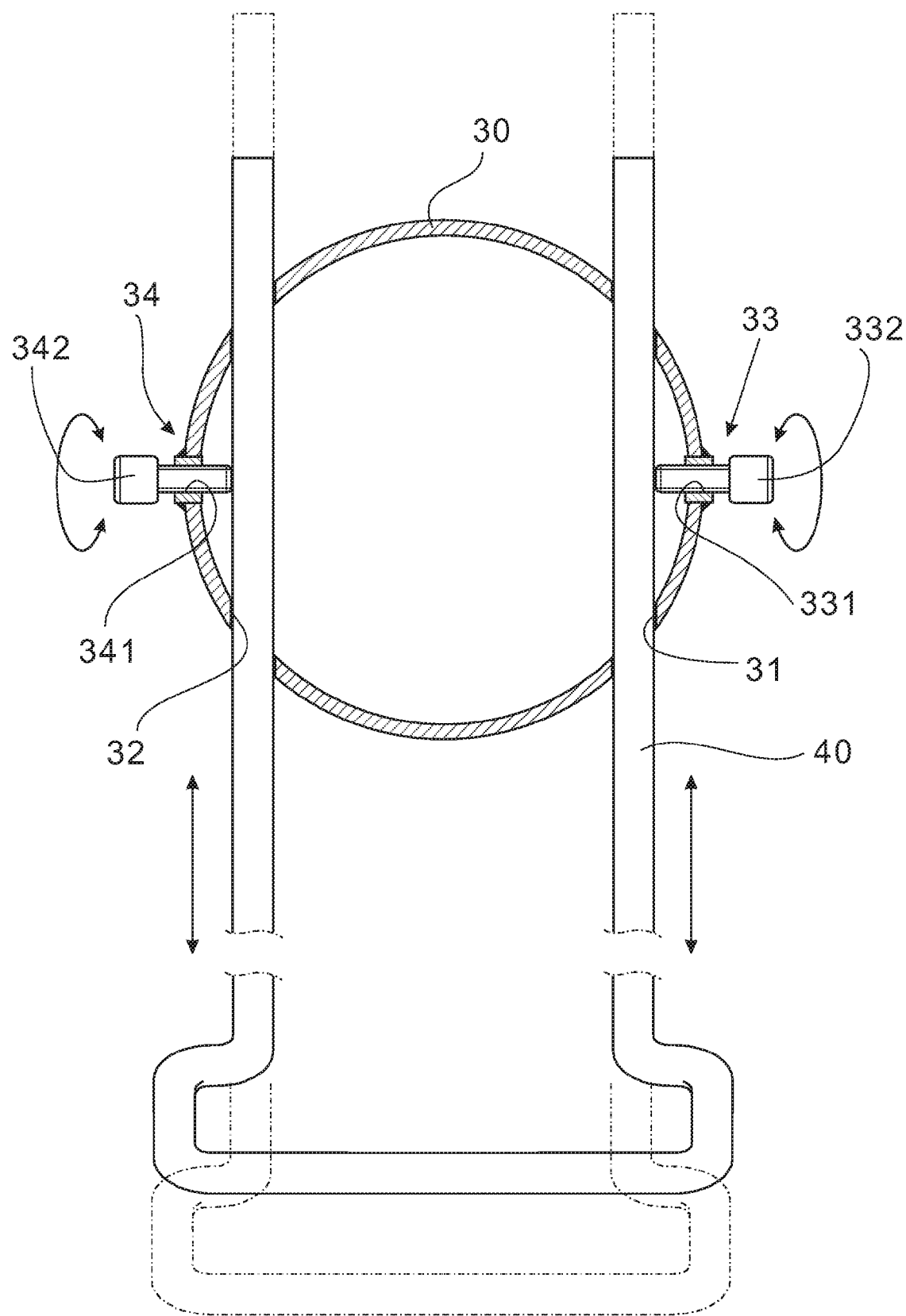
FIG. 3 is a view similar to FIG. 2 showing the coupling being adapted to slide upward or downward along the arms.

Referring to FIGS. 1 to 3, a holder in accordance with a first preferred embodiment of the invention for supporting an LCD display 10 is shown. The holder comprises a substantially U-shaped support 40 adapted to stably rest upon a flat surface (e.g., desktop), the support 40 having two upright arms (not numbered). The holder further comprises a fastening plate 20 having four threaded fasteners 21 adapted to secure to the LCD display 10. The holder further comprises a coupling 30 formed at the rear of the fastening plate 20. The hollow cylindrical coupling 30 comprises two spaced lower through holes 31, 32, two spaced upper through holes (not numbered) with the arms of the support 40 passing through the lower and upper through holes, a right fastening assembly 33 having a right threaded hole 331 formed on the right portion of the coupling 30 and a right threaded fastener 332 driven through the right threaded hole 331 to urge against the right arm of the support 40 for fastening, and a left fastening assembly 34 having a left threaded hole 341 formed on the left portion of the coupling 30 and a left threaded fastener 342 driven through the left threaded hole 341 to urge against the left arm of the support 40 for fastening.

In use, an individual may unfasten both the threaded fasteners 332, 342. Next, slide the coupling 30 upward or downward along the arms of the support 40 for adjusting the vertical position of the LCD display 10. Finally, fasten both the threaded fasteners 332, 342 again. It is envisaged by the invention that the height adjustment of the LCD display 10 can be achieved by performing the above simple steps without manipulating the LCD display 10. Thus, the LCD display 10 is not subject to damage.

Figure 4:
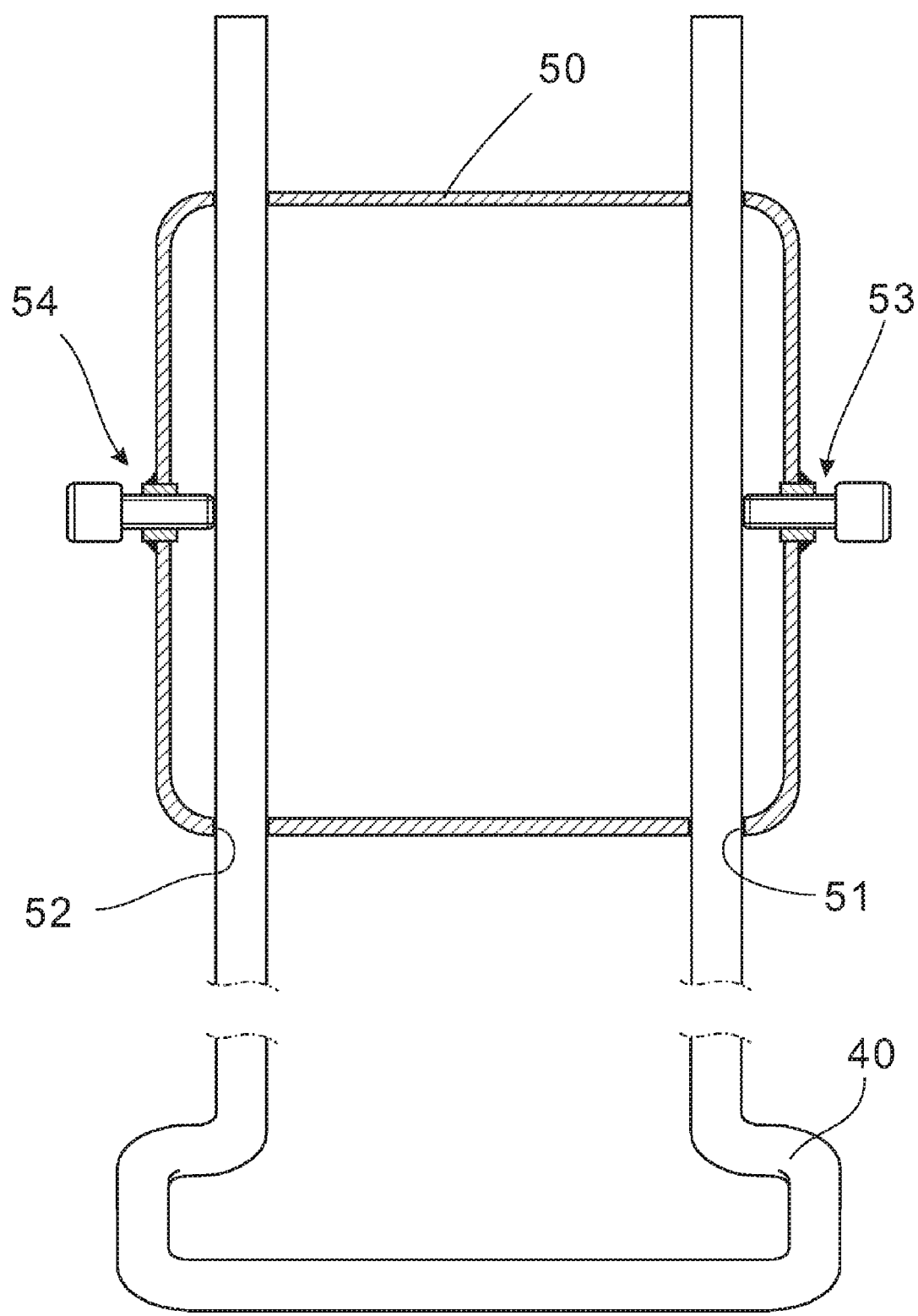
FIG. 4 is a longitudinal sectional view of the coupling of a second preferred embodiment of LCD display holder according to the invention.
Figure 5:
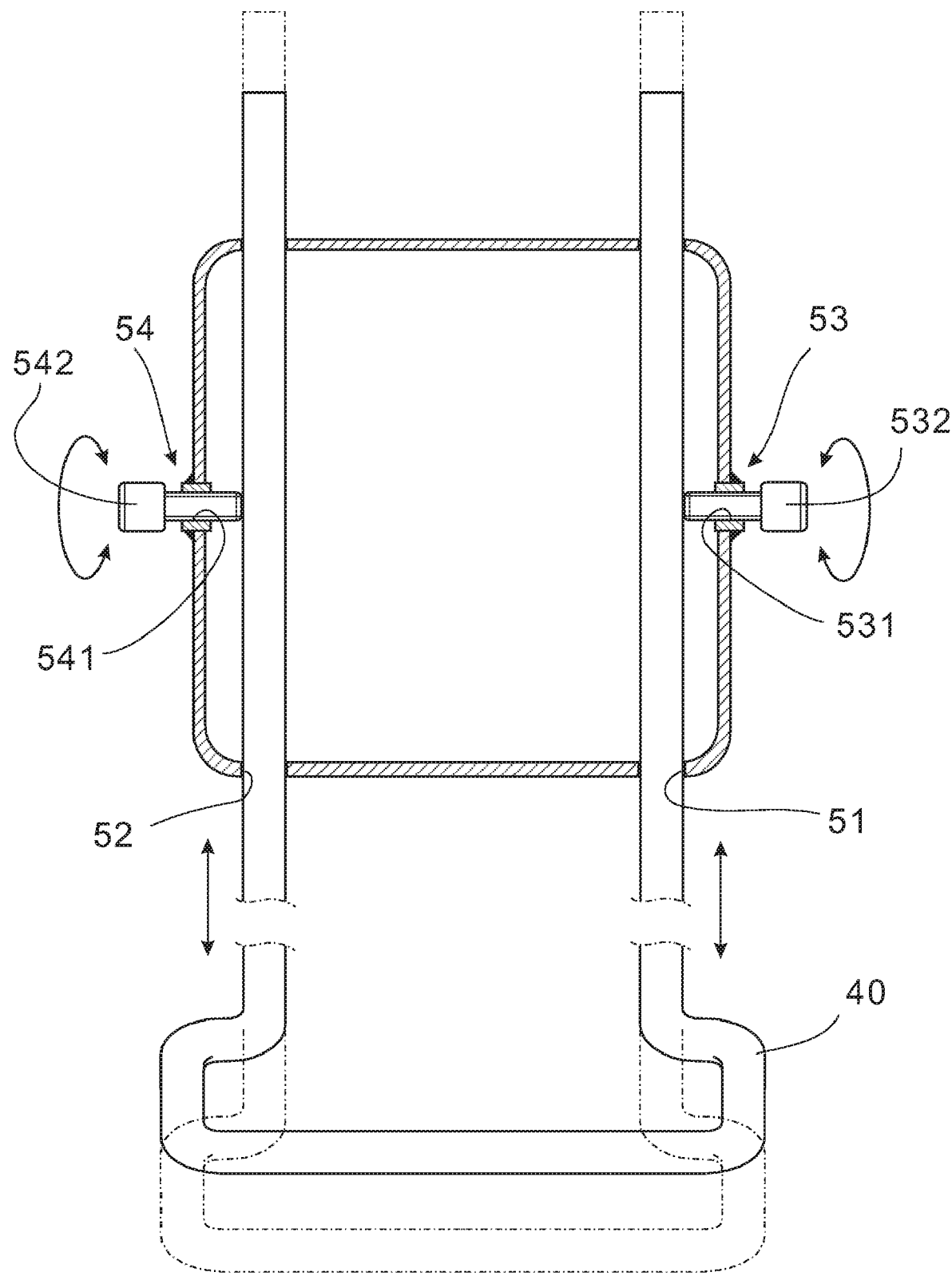
FIG. 5 is a view similar to FIG. 4 showing the coupling being adapted to slide upward or downward along the arms.

Referring to FIGS. 4 and 5, a holder in accordance with a second preferred embodiment of the invention for supporting an LCD display is shown. The characteristics of the second preferred embodiment are detailed below.

The holder further comprises a hollow coupling 50 with a square section. The coupling 50 comprises two spaced lower through holes 51, 52, two spaced upper through holes (not numbered) with the arms of the support 40 passing through the lower and upper through holes, a right fastening assembly 53 having a right threaded hole 531 formed on the right portion of the coupling 50 and a right threaded fastener 532 driven through the right threaded hole 531 to urge against the right arm of the support 40 for fastening, and a left fastening assembly 54 having a left threaded hole 541 formed on the left portion of the coupling 50 and a left threaded fastener 542 driven through the left threaded hole 541 to urge against the left arm of the support 40 for fastening.

In use, an individual may unfasten both the threaded fasteners 532, 542. Next, slide the coupling 50 upward or downward along the arms of the support 40 for adjusting the vertical position of an LCD display (not shown). Finally, fasten both the threaded fasteners 532, 542 again. It is envisaged by the invention that the height adjustment of the LCD display can be achieved by performing the above simple steps without manipulating the LCD display. Thus, the LCD display is not subject to damage.

While the invention herein disclosed has been described by means of specific embodiments, numerous modifications and variations could be made thereto by those skilled in the art without departing from the scope and spirit of the invention set forth in the claims.

What is claimed is:

1. A device for holding an LCD display comprising:
   a substantially U-shaped support adapted to stably rest upon a flat surface, the support having two upright arms;
   a fastening plate threadedly secured to the LCD display; and
   a hollow coupling extending rearward of the fastening plate, the hollow coupling comprising two vertically aligned first holes proximate one side, two vertically aligned second holes proximate the other side, a first threaded hole at one side, and a second threaded hole at the other side;
   wherein the arms are adapted to pass through the first and second holes, a first fastener is adapted to drive through the first threaded hole to secure to one arm, and a second fastener is adapted to drive through the second threaded hole to secure to the other arm.

2. The device of claim 1, wherein the hollow coupling has a square section.

3. The device of claim 1, wherein the hollow coupling has a cylindrical section.

* * * * *